(12) United States Patent
Yang et al.

(10) Patent No.: US 8,445,128 B2
(45) Date of Patent: May 21, 2013

(54) LATCHING MODULE, BATTERY COVER ASSEMBLY USING THE LATCHING MODULE AND PORTABLE ELECTRONIC DEVICE USING THE BATTERY COVER ASSEMBLY

(75) Inventors: Mu-Wen Yang, Taipei Hsien (TW); Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 888 days.

(21) Appl. No.: 12/546,795

(22) Filed: Aug. 25, 2009

(65) Prior Publication Data
US 2010/0136400 A1  Jun. 3, 2010

(30) Foreign Application Priority Data
Nov. 28, 2008  (CN) .......................... 2008 1 0305855

(51) Int. Cl.
*H01M 2/10* (2006.01)
*H01M 2/00* (2006.01)

(52) U.S. Cl.
USPC .......................................... 429/100; 429/163

(58) Field of Classification Search
USPC ...... 429/96–100, 163; 206/703–705; 455/572, 455/575.1–575.3, 578.8; 220/770, 200, 4.28, 220/203.18, 213, 287, 780
See application file for complete search history.

(56) References Cited

U.S. PATENT DOCUMENTS

| | | | |
|---|---|---|---|
| 2007/0042232 A1* | 2/2007 | Takeshita et al. | 429/1 |
| 2007/0082234 A1* | 4/2007 | Ladouceur et al. | 429/9 |
| 2009/0170577 A1* | 7/2009 | Liu | 455/575.8 |

* cited by examiner

*Primary Examiner* — Barbara Gilliam
*Assistant Examiner* — Claire L Roe
(74) *Attorney, Agent, or Firm* — Altis Law Group, Inc.

(57) ABSTRACT

A latching module includes a main body and two elastic members. The main body includes two opposite sidewalls and a first surface connecting with the sidewalls, the first surface configured for resisting the battery. The two elastic members are respectively mounted to the sidewalls of the main body. Each elastic member has at least one latching portion and at least one stopping portion.

18 Claims, 5 Drawing Sheets

LATCHING MODULE, BATTERY COVER ASSEMBLY USING THE LATCHING MODULE AND PORTABLE ELECTRONIC DEVICE USING THE BATTERY COVER ASSEMBLY

BACKGROUND

1. Technical Field

The exemplary invention generally relates to latching modules, battery cover assemblies using the latching modules and portable electronic devices using the battery cover assemblies.

2. Description of Related Art

Portable electronic devices, such as two-way radios, telephones, electronic games and personal data assistants for example, often receive operating power from a removable battery. In many such configurations, a removable battery is secured to a housing of the portable electronic device by a latch system. The latch system ordinarily includes a portion situated on a battery cover, and a portion situated on the housing. These portions engage to secure the battery in the portable electronic device.

In one commonly used structure, the latch system includes a catch on the battery cover that engages a latch member on the housing. Additionally, the battery cover resists a surface of the battery to firmly fix the battery in the portable electronic device. Removal of the battery from the housing is normally accomplished by sliding the battery cover relative to the housing, disengaging the latch member. One problem with this method is that abrasion is inflicted on the surfaces of the battery cover and the battery during the sliding operation. The battery cover must often be replaced after repeated use, which can result in substantial expense.

Therefore, there is a room for improvement in the arts.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary latching module, battery cover assembly using the latching module and portable electronic device using the battery cover assembly. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
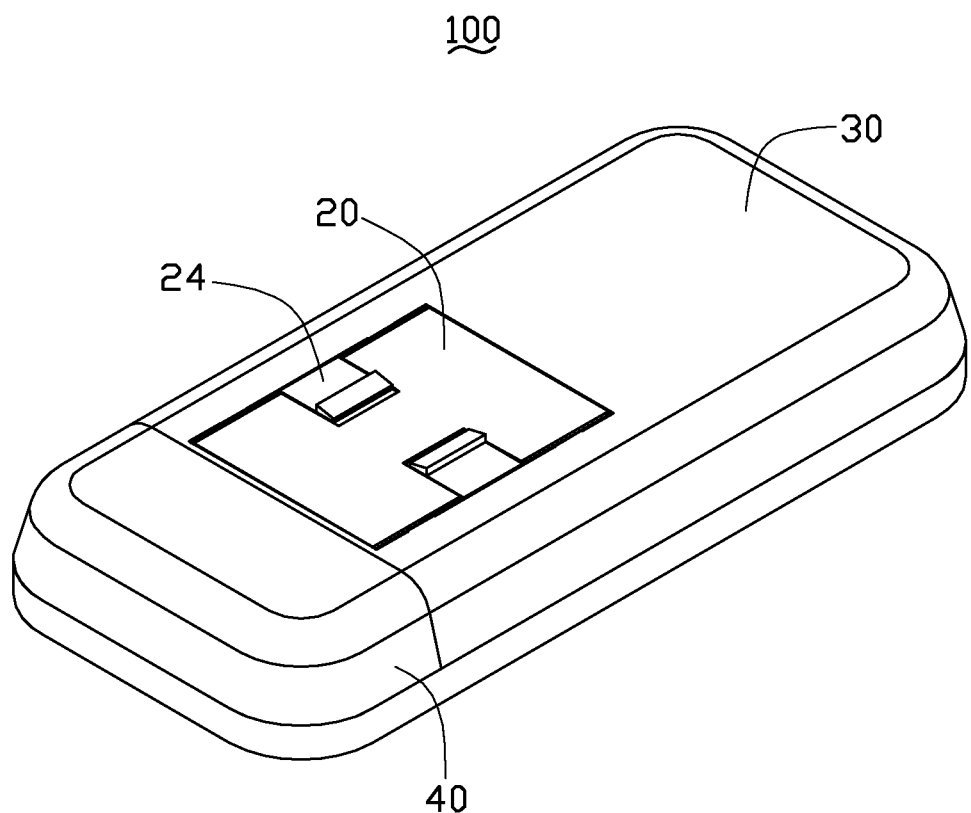
FIG. 1 is an assembled view of a portable electronic device using a portable electronic device according to an exemplary embodiment.
Figure 2:
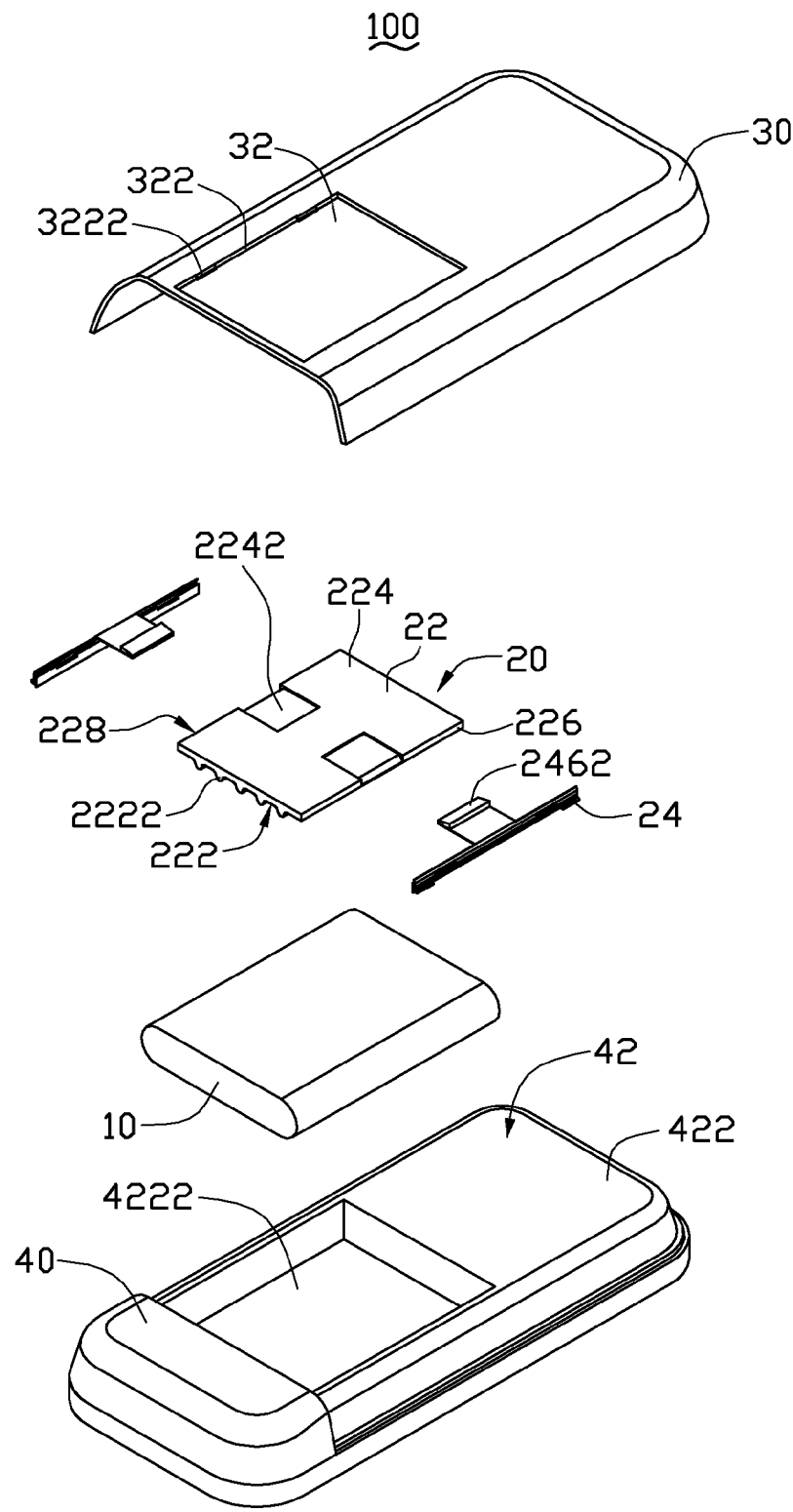
FIG. 2 is an exploded view of a portable electronic device, according to an exemplary embodiment.

Referring to FIGS. 1 and 2, a portable electronic device 100 having a battery 10 accommodated therein is shown. The portable electronic device 100 includes a latching module 20, a portion of battery housing member 40 and a portion of a battery cover 30. The latching module 20 is latched to the battery cover 30, as is described following. The battery cover 30 attaches to the battery housing member 40 to form an enclosure (not labeled) for accommodating the battery 10 therein. The battery cover 30 may be engaged with the battery housing member 40 by any commonly used latch structure The latching module 20 includes a main body 22 and two elastic members 24 mounted on two opposite sides of the main body 22. In the exemplary embodiment, the elastic members 24 are symmetric. The main body 22 includes a first surface 222 facing the battery housing member 40, a second surface 224 opposite to the first surface 222, a first sidewall 226 connecting with the first surface 222 and the second surface 224 and a second sidewall 228 opposite to the first sidewall 226. The main body 22 has a plurality of resisting portions in the form of spaced strips 2222 protruding from the first surface 222. The strips 2222 are configured to resist against a surface of the battery 10. The main body 22 has two receiving portions in the form of two cavities 2242 defined in the second surface 224 and corresponding in alignment with the elastic members 24. The cavities 2242 are configured to receive the elastic members, correspondingly.

Figure 3:
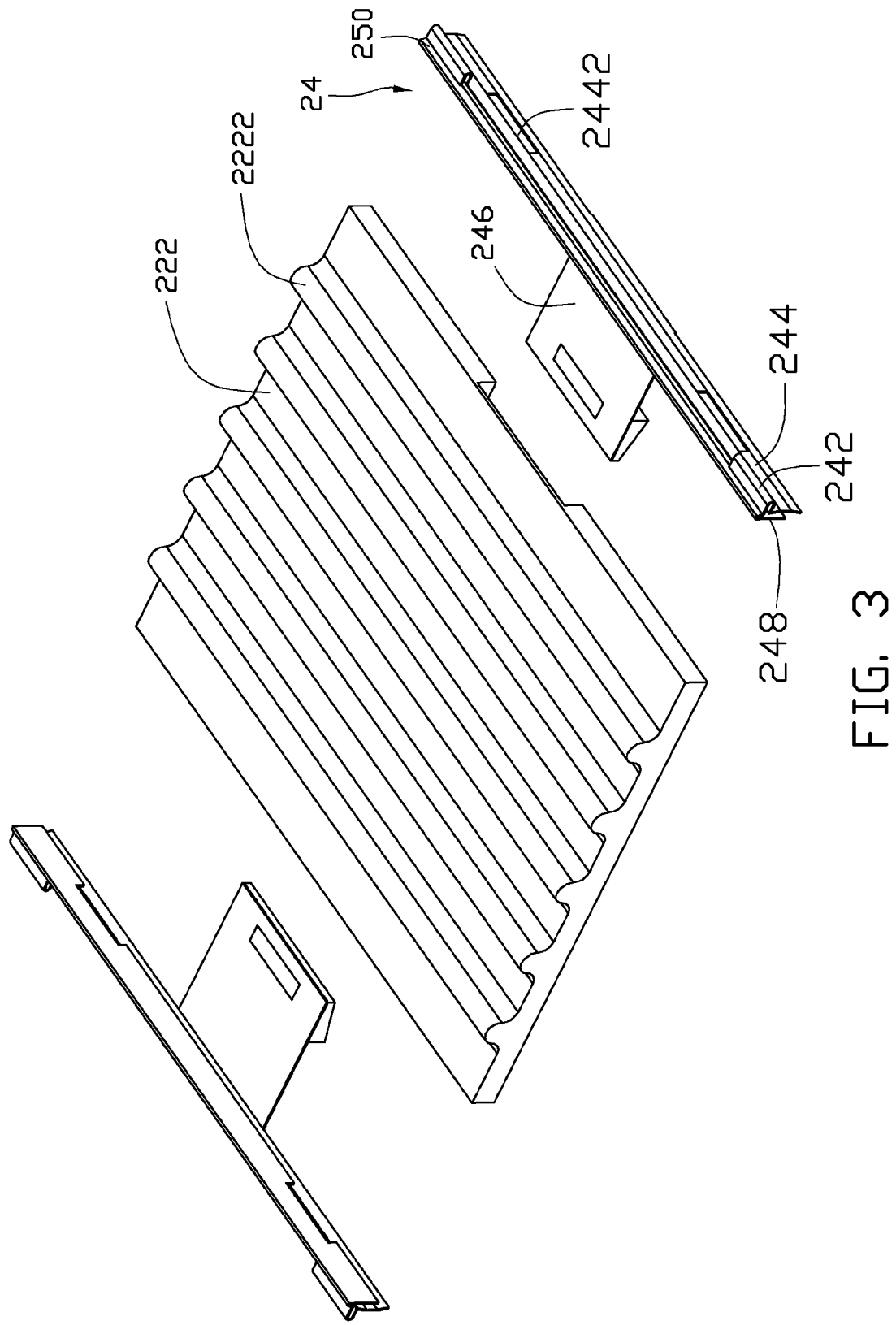
FIG. 3 is an enlarged view of an elastic member shown in FIG. 2.

Referring to FIG. 3, Each elastic member 24 includes a first resilient plate 244, a second resilient plate 248 parallel to the first resilient plate 244 and a connecting portion 250 connecting the first resilient plate 244 with the second resilient plate 248. The first resilient plate 244 has at least one projection 242 extending away from the second resilient plate 248 that forms a stopping portion for the elastic member 24. The first resilient plate 244 further includes two latching portions. Preferably, each latching portion is a slot 2442 extending through an end portion of the first resilient plate 244.

The elastic member 24 further includes a resilient sheet 246 protruding from, e.g., a center portion of the first resilient plate 244 opposite to the projections 242. The sheet 246 has a finger grip portion 2462 formed on a distal portion thereof.

Figure 4:
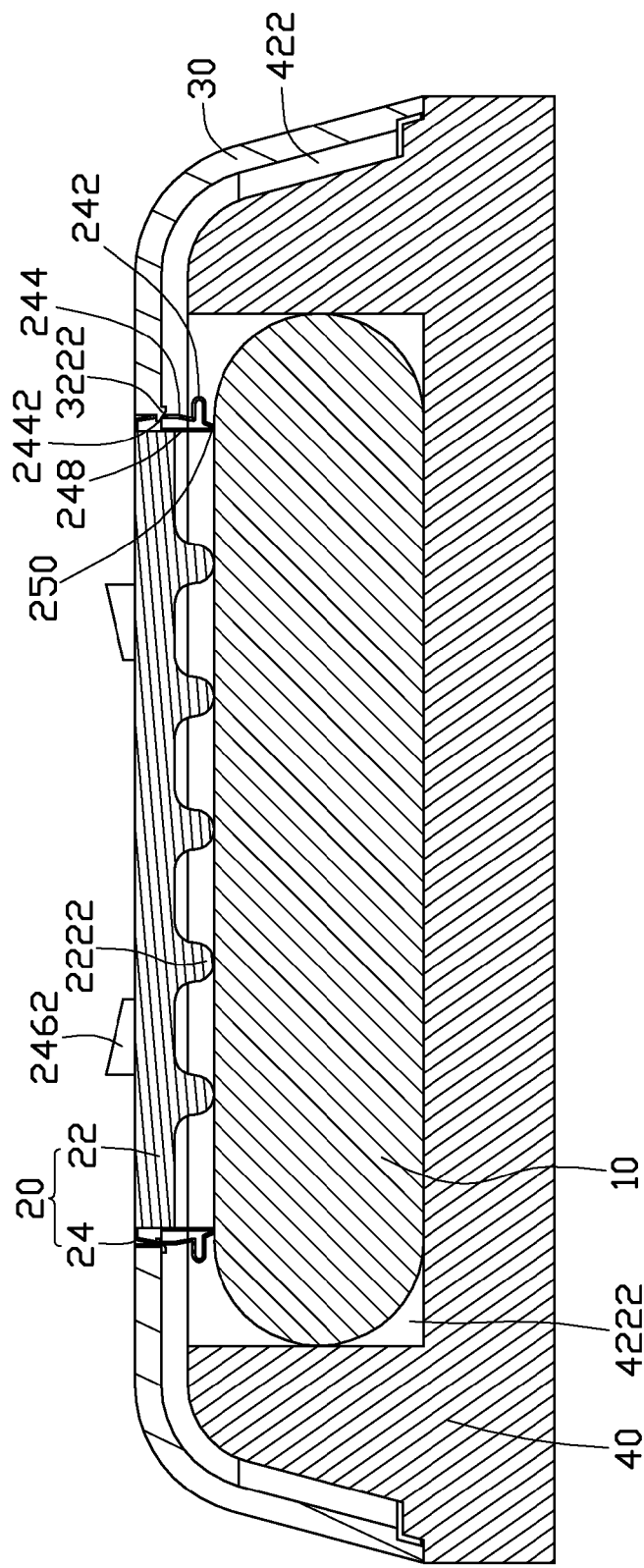
FIG. 4 is a cross-section of a portable electronic device in which a latching module according to an exemplary embodiment is resisting a battery.

Referring to FIGS. 2 and 4, the battery cover 30 has a hole 32 accommodating the latching module 20, and two opposite inner walls 322 defined in the hole 32. Each inner wall 322 has two wedged protrusions 3222 extending toward another inner wall 322. The protrusions 3222 correspond to and latch with the slots 2442, correspondingly.

The battery housing member 40 has a receiving groove 42 defined therein for accommodating the battery cover 30, with a bottom wall 422 formed in the receiving groove 42. The battery housing member 40 has a compartment 4222 defined in the bottom wall 422 for accommodating the battery 10 therein.

Referring to FIGS. 2 and 4, during assembly of the portable electronic device 100, the second resilient plates 248 of the elastic members 24 are respectively mounted (for example heat-melted) to the first sidewall 226 and the second sidewall 228 of the main body 22, resulting in the assembled latching module 20. At this time, the cantilever sheets 246 of the elastic members 24 are received in the corresponding cavities 2242 of the main body 22. Latching module 20 is aligned with the hole 32.

The latching module 20 is pressed into the hole 32 with the first resilient plates 244 biased toward the second resilient plates 248, so that the first resilient plates 244 are compressed to accumulate elastic force. Once the slots 2442 of the first resilient plates 244 align with the protrusions 3222 in the hole 32, the first resilient plates 244 return to their original state and the protrusions 3222 are latched within the slots 2442. Thus, the latching module 20 is secured to the battery cover 30.

The battery cover 30 is attached to the battery housing member 40 with the strips 2222 resisting the battery 10, such that the battery 10 is firmly accommodated in the compartment 4222.

Figure 5:
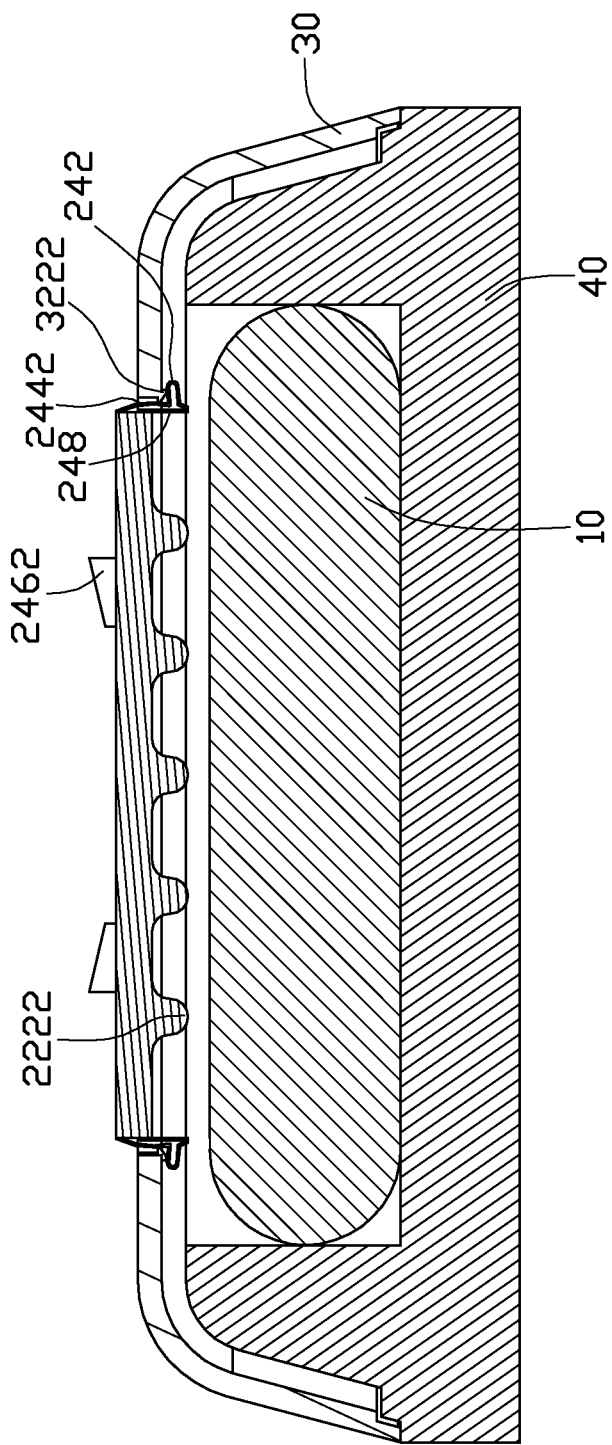
FIG. 5 is similar to the FIG. 5, but the latching module is raised from the battery cover.

Referring to FIGS. 4 and 5, removal of the battery 10 from compartment 4222 is accomplished by finger grip portions 2462 being moved toward each other, bringing the first resilient plates 244 towards the second resilient plates 248, until the protrusions 3222 of the battery cover 30 are released from the slots 2442 of the first resilient plates 244. Then, the latching module 20 is slightly raised from the hole 32 away from the battery 10, until the projections 242 of the elastic member 24 are stopped by an inner surface of the battery cover 30, to stop the main body 22 from separating from the battery cover 30. At this time, the projections 242 become spaced from the battery 10 and battery 10 is released from the resisting engagement of the projections 242. The battery cover 30 is then slid relative to the battery housing member 40 to expose the battery 10 which can then be removed from the compartment 4222.

The battery 10 is released from the latching module 20 when the battery cover 30 slides relative to the battery housing member 40, protecting the battery 10 and the battery cover 30 from abrasion or other damage.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A latching module for securing a battery, the latching module comprising:
   a main body comprising two opposite sidewalls, a first surface connecting with the sidewalls, and a second surface opposite to the first surface, the first surface configured for resisting the battery, the second surface defining two opposite cavities; and
   two elastic members respectively mounted to the sidewalls of the main body, each elastic member comprising a first resilient plate, a second resilient plate parallel to the first resilient plate, at least one slot being defined in the first resilient plate and at least one stopping portion protruding from the first resilient plate away from the second resilient plate, a sheet protruding perpendicularly from near a center portion of the first resilient plate opposite to the stopping portion, the sheet being movably received in a corresponding cavity.

2. The latching module as claimed in claim 1, wherein a connecting portion connecting the first resilient plate with the second resilient plate, with the second resilient plate mounted on the main body.

3. The latching module as claimed in claim 2, wherein each sheet comprises a finger grip portion protruding from a distal portion thereof.

4. The latching module as claimed in claim 3, wherein the main body comprises a plurality of resisting portions protruding from the first surface and resisting the battery.

5. The latching module as claimed in claim 4, wherein the resisting portions comprise a plurality of spaced strips.

6. A battery cover assembly, comprising:
   a battery cover; and
   a latching module releasably latched to the battery cover and comprising:
   a main body comprising two opposite sidewalls, a first surface connecting with the sidewalls, and a second surface opposite to the first surface, the first surface configured for resisting a battery, the second surface defining two opposite cavities; and
   two elastic members respectively mounted to the sidewalls of the main body, each comprising a first resilient plate, a second resilient plate parallel to the first resilient plate, at least one slot being defined on the first resilient plate and at least one stopping portion protruding from the first resilient plate away from the second resilient plate, a sheet protruding perpendicularly from near a center portion of the first resilient plate opposite to the stopping portion, the sheet being movably received in a corresponding cavity;
   wherein the at least one slot is releasably latched with the battery cover, and the stopping portions are configured to resist an inner surface of the battery cover to stop the latching module from disengaging from the battery cover.

7. The battery cover assembly as claimed in claim 6, wherein the battery cover comprises a plurality of protrusions corresponding to the slots, and the protrusions are received in the slots to latch the latching module with the battery cover.

8. The battery cover assembly as claimed in claim 7, wherein the battery cover comprises a hole therethrough corresponding to the latching module, and two opposite inner walls are defined in the hole, the latching module being received in the hole and the protrusions protruding from the inner wall.

9. The battery cover assembly as claimed in claim 6, wherein a connecting portion connecting the first resilient plate with the second resilient plate, wherein the second resilient plates are mounted to the main body.

10. The battery cover assembly as claimed in claim 6, wherein each sheet comprises a finger grip portion protruding on a distal portion thereof.

11. The battery cover assembly as claimed in claim 10, wherein the main body comprises a plurality of resisting portions protruding from the first surface, and the resisting portions resist the battery.

12. The battery cover assembly as claimed in claim 11, wherein the resisting portions comprise a plurality of spaced strips.

13. A portable electronic device, comprising:
    a battery housing member comprising a compartment defined therein receiving a battery;
    a battery cover slidably mounted on the battery housing member and covering the compartment; and
    a latching module releasably latched to the battery cover and resisting the battery, the latching module comprising:
    a main body comprising two opposite sidewalls and a first surface connecting with the sidewalls, the first surface configured for resisting the battery; and
    two elastic members respectively mounted to the sidewalls of the main body, each comprising at least one slot and at least one stopping portion thereon;
    wherein each elastic member comprises a first resilient plate, each slot is defined in the first resilient plate, the battery cover comprises a plurality of protrusions corresponding to the slots, and the protrusions are received in the slots to latch the latching module with the battery cover, and the stopping portions are configured to resist an inner surface of the battery cover to prevent the latching module from disengaging from the battery cover.

14. The portable electronic device as claimed in claim 13, wherein the main body further comprises a second surface opposite to the first surface, the second surface defines two opposite cavities.

15. The portable electronic device as claimed in claim 14, wherein each elastic member comprises a second resilient plate parallel to the first resilient plate, the at least one stopping portion protrudes from the first resilient plate away from the second resilient plate, a sheet protrudes perpendicularly from near a center portion of the first resilient plate opposite to the stopping portion, the sheet is movably received in a corresponding cavity.

16. The portable electronic device as claimed in claim 15, wherein each sheet comprises a finger grip portion protruding from a distal portion thereof.

17. The portable electronic device as claimed in claim 16, wherein the main body comprises a plurality of resisting portions protruding from the first surface and resisting the battery.

18. The portable electronic device as claimed in claim 17, wherein the resisting portions comprise a plurality of spaced strips.

* * * * *